US012700272B2

(12) United States Patent
Sato

(10) Patent No.: US 12,700,272 B2
(45) Date of Patent: Aug. 4, 2026

(54) REAL-TIME SELECTION OF DATA TO COLLECT IN AUTONOMOUS VEHICLE

(71) Applicant: Lodestar Licensing Group LLC, Evanston, IL (US)

(72) Inventor: Junichi Sato, Yokohama (JP)

(*) Notice: Subject to any disclaimer, the term of this patent is extended or adjusted under 35 U.S.C. 154(b) by 501 days.

(21) Appl. No.: 17/515,172

(22) Filed: Oct. 29, 2021

(65) Prior Publication Data

US 2022/0051490 A1 Feb. 17, 2022

Related U.S. Application Data

(63) Continuation of application No. 16/156,698, filed on Oct. 10, 2018, now Pat. No. 11,182,986.

(51) Int. Cl.
| | |
|---|---|
| *G07C 5/08* | (2006.01) |
| *G05D 1/00* | (2006.01) |
| *G07C 5/00* | (2006.01) |
| *H04W 4/38* | (2018.01) |
| *H04W 4/40* | (2018.01) |

(52) U.S. Cl.
CPC ........... *G07C 5/085* (2013.01); *G05D 1/0088* (2013.01); *G07C 5/008* (2013.01); *H04W 4/38* (2018.02); *H04W 4/40* (2018.02)

(58) Field of Classification Search
CPC ...... G07C 5/085; G07C 5/008; G07C 5/0841; G05D 1/0088; H04W 4/38; H04W 4/40; H04W 4/44; G06N 3/045; G06N 3/08
See application file for complete search history.

(56) References Cited

U.S. PATENT DOCUMENTS

| | | | |
|---|---|---|---|
| 6,629,022 B1 * | 9/2003 | Gessner | .............. G05B 19/042 |
| | | | 701/1 |
| 6,806,885 B1 | 10/2004 | Piper et al. | |
| 7,809,481 B2 | 10/2010 | Okada et al. | |
| 8,583,327 B2 | 11/2013 | Xiao | |
| 10,083,588 B1 | 9/2018 | Kapoor et al. | |
| 10,086,782 B1 | 10/2018 | Konrardy et al. | |
| 10,162,558 B2 | 12/2018 | Zhang et al. | |
| 10,261,720 B2 | 4/2019 | Eloy | |
| 10,553,120 B2 | 2/2020 | Schmutz et al. | |

(Continued)

FOREIGN PATENT DOCUMENTS

| | | |
|---|---|---|
| CN | 1425579 | 6/2003 |
| CN | 1811825 | 8/2006 |

(Continued)

OTHER PUBLICATIONS

Automatic Collection of Autonomous Vehicle Logging Data, U.S. Appl. No. 16/150,618, filed Oct. 3, 2018, Junichi Sato, Final Rejection Mailed, Dec. 1, 2021.

(Continued)

*Primary Examiner* — Redhwan K Mawari

(57) ABSTRACT

A method for an autonomous vehicle includes: controlling at least one system of the vehicle by a host system; monitoring, by a memory device, data associated with operation of the vehicle; determining, by the memory device based on the monitoring, first data to collect from the vehicle; collecting, by the memory device independently of the host system, the first data; and storing, by the memory device, the collected first data in a non-volatile memory.

17 Claims, 10 Drawing Sheets

(56) References Cited

U.S. PATENT DOCUMENTS

| | | | |
|---|---|---|---|
| 10,802,484 | B2 | 10/2020 | Jiang et al. |
| 11,182,986 | B2 | 11/2021 | Sato |
| 11,670,123 | B2 | 6/2023 | Sato |
| 2002/0033946 | A1 | 3/2002 | Thompson |
| 2004/0178488 | A1* | 9/2004 | Bolken ................ H01L 25/105 |
| | | | 257/737 |
| 2006/0145337 | A1 | 7/2006 | Lee |
| 2007/0083305 | A1* | 4/2007 | Okada ................... G07C 5/008 |
| | | | 701/31.4 |
| 2013/0066815 | A1 | 3/2013 | Oka et al. |
| 2014/0088821 | A1 | 3/2014 | Nordlander |
| 2015/0067313 | A1* | 3/2015 | Zaidi ................... G06F 21/572 |
| | | | 713/2 |
| 2015/0160863 | A1 | 6/2015 | Mylly |
| 2015/0381441 | A1 | 12/2015 | Schalke et al. |
| 2016/0034158 | A1 | 2/2016 | Livesay et al. |
| 2016/0054400 | A1* | 2/2016 | van Beek ............ G01R 33/038 |
| | | | 324/259 |
| 2016/0155315 | A1 | 6/2016 | McElhinney et al. |
| 2016/0203656 | A1* | 7/2016 | Bhogal ................ G07C 5/0808 |
| | | | 701/32.2 |
| 2017/0050588 | A1 | 2/2017 | Hammerschmidt |
| 2017/0076396 | A1 | 3/2017 | Sudak |
| 2017/0161967 | A1 | 6/2017 | Matsuo |
| 2018/0227306 | A1* | 8/2018 | Borkowicz ......... H04L 63/0227 |
| 2018/0293809 | A1* | 10/2018 | James ..................... H04W 4/38 |
| 2018/0336144 | A1 | 11/2018 | Olarig et al. |
| 2018/0365964 | A1* | 12/2018 | Carson ................... G01K 1/022 |
| 2019/0012488 | A1 | 1/2019 | Wang et al. |
| 2019/0018712 | A1* | 1/2019 | Foxworth ............. G06F 3/0646 |
| 2019/0111984 | A2 | 4/2019 | Bean et al. |
| 2019/0220011 | A1* | 7/2019 | Della Penna ........ G08G 1/0112 |
| 2019/0318555 | A1 | 10/2019 | Hansel et al. |
| 2020/0111270 | A1 | 4/2020 | Sato |
| 2020/0118359 | A1 | 4/2020 | Sato |

FOREIGN PATENT DOCUMENTS

| | | | | |
|---|---|---|---|---|
| CN | 101208724 | 6/2008 | | |
| CN | 101238375 | 8/2008 | | |
| CN | 102354197 | 2/2012 | | |
| CN | 102456240 | 5/2012 | | |
| CN | 102956045 | 3/2013 | | |
| CN | 203503020 | 3/2014 | | |
| CN | 104859649 | 8/2015 | | |
| CN | 106202157 | 12/2016 | | |
| CN | 106603620 | 4/2017 | | |
| CN | 107077780 | 8/2017 | | |
| CN | 107545064 | 1/2018 | | |
| CN | 108319163 | 7/2018 | | |
| JP | 2004206495 A | * | 7/2004 | .......... G06F 11/3495 |
| JP | 2013208896 | 10/2013 | | |
| JP | 2015072651 | 9/2015 | | |
| WO | 8501819 | 4/1985 | | |

OTHER PUBLICATIONS

Real-Time Selection of Data Collect in Autonomous Vehicle, U.S. Appl. No. 16/156,698, filed Oct. 10, 2018, Junichi Sato, Patented Case, Dec. 18, 2020.

IP Law, "Mai v. Peak: Should Loading Operating System Software Into RAM Constitute Copyright Infringement?" Golden Gate University, 1994.

Lo, David, et al., "Classification of Software Behaviors for Failure Detection: A Discriminative Pattern Mining Approach." ACM, 2009.

* cited by examiner

REAL-TIME SELECTION OF DATA TO COLLECT IN AUTONOMOUS VEHICLE

RELATED APPLICATIONS

The present application is a continuation application of U.S. patent application Ser. No. 16/156,698, filed Oct. 10, 2018, entitled "REAL-TIME SELECTION OF DATA TO COLLECT IN AUTONOMOUS VEHICLE," the entire disclosure of which application is hereby incorporated herein by reference.

This application is related to U.S. Non-Provisional application Ser. No. 16/150,618, filed Oct. 3, 2018, entitled "AUTOMATIC COLLECTION OF AUTONOMOUS VEHICLE LOGGING DATA," by Junichi Sato, the entire contents of which application is incorporated by reference as if fully set forth herein.

This application is also related to U.S. Non-Provisional application Ser. No. 16/010,646, filed Jun. 18, 2018, entitled "Downloading System Memory Data in Response to Event Detection," by Junichi Sato, the entire contents of which application is incorporated by reference as if fully set forth herein.

This application is also related to U.S. Non-Provisional application Ser. No. 15/879,954, filed Jan. 25, 2018, entitled "In-Vehicle Monitoring and Reporting Apparatus for Vehicles," by Mondello et al., the entire contents of which application is incorporated by reference as if fully set forth herein.

FIELD OF THE TECHNOLOGY

At least some embodiments disclosed herein relate to memory systems in general, and more particularly, but not limited to, collection and storage of autonomous vehicle data.

BACKGROUND

Autonomous vehicles typically include many sensors to assist in controlling the autonomous vehicle. In the case of an accident, collision, or near collision involving the vehicle, there may be a benefit from reviewing the sensor data recorded just prior to and/or during the accident to assist in potentially determining the cause of the accident, and/or whether there may have been a vehicle failure.

In the event of a power loss during the accident, vehicle sensor data stored in a volatile memory may be lost. Also, the sensor data collected from an autonomous vehicle is most useful when the data is uncompressed.

Memory systems that store data include storage systems, such as a solid-state drive (SSD), and can include one or more memory components that store data. For example, a memory system can include non-volatile memory and volatile memory. In general, a host system can control a memory system to store data (e.g., using various types of storage media) at the memory system and to retrieve data stored at the memory system.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
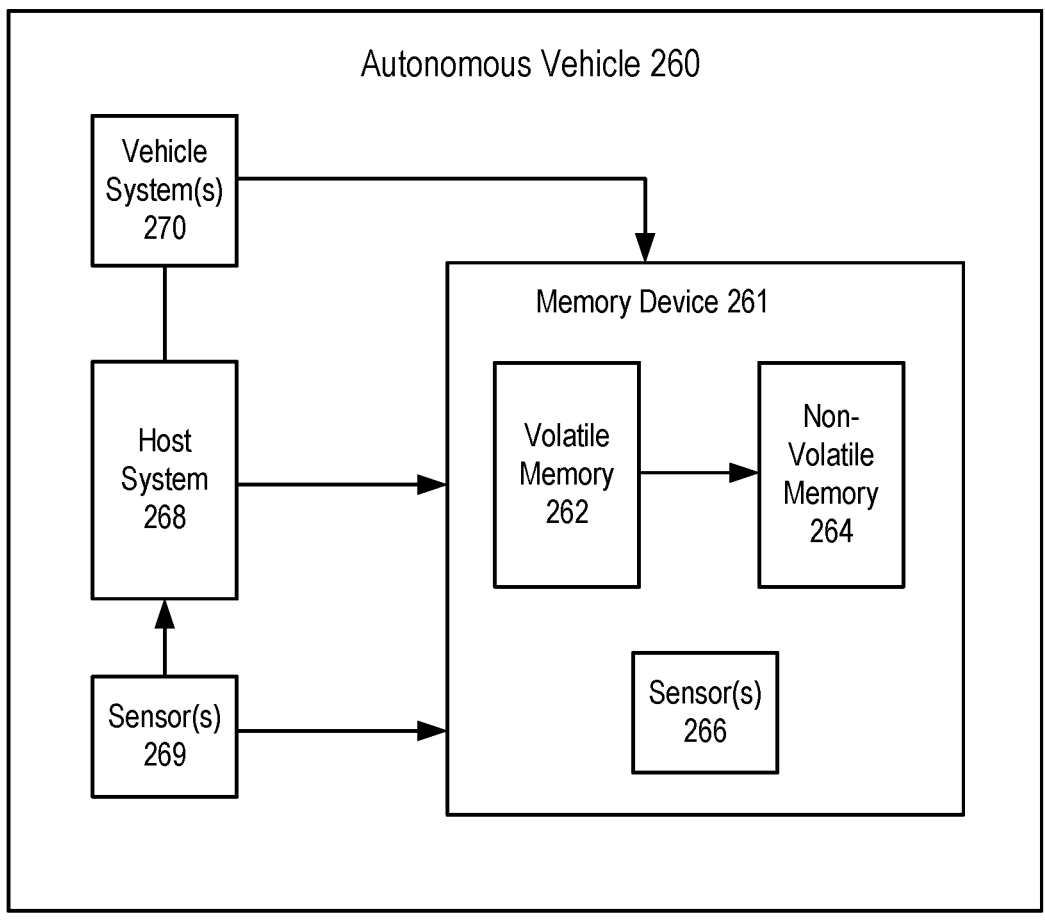
FIG. 1 illustrates an autonomous vehicle including a memory device that collects data from the vehicle and stores the data in non-volatile memory, according to one embodiment.

In the event of an accident or other adverse operating event, existing autonomous vehicles do not adequately collect data that can be used for later analysis to determine the cause of the accident or event. This presents the technical problem that data necessary for analysis (e.g., analysis of software operation) to determine the cause of the accident or event is not available. Also, different types of data are needed depending on the type of accident.

Various embodiments disclosed herein solve the above technical problem by providing a memory device that automatically copies data from volatile memory (e.g., DRAM) to non-volatile memory (e.g., NAND memory). The copying of this data is triggered in response to detecting the accident or other adverse event. In one case, the volatile memory is DRAM of a multi-chip package (MCP) product, and the data is copied to NAND memory of the MCP product. In one example, the MCP product includes NAND memory and DDR4 DRAM.

The MCP product automatically copies the data to non-volatile memory without requiring any control action from a host controller (e.g., a host system controlling navigation of the vehicle). For example, the MCP product determines the particular data to be copied or collected based on information that the MCP product itself is monitoring and/or data that is received by the MCP product from the vehicle. In some embodiments, the MCP product determines in real-time the type of data to collect, based on the operational context of the vehicle (e.g., is it moving rapidly down a highway, is it navigating crowded city streets, is a vehicle system indicating operational deviations or providing error or warning messages, etc.).

For example, the MCP product itself can contain one or more sensors that can be used to trigger the collection of the data. In one example, the MCP product includes one or more accelerometers (e.g., to detect sudden acceleration changes of the vehicle or other motion of the vehicle). A signal from the accelerometer triggers the collection of data. Data from sensors of the MCP product can be combined with data from sensors of other vehicle systems, and analysis of the combined data can be used to determine the types of data, and/or from which vehicle systems, to collect data.

In another example, the MCP product can monitor one or more signals output from the host controller (e.g., of a host system of the vehicle). Based on the signals, the MCP product can make a decision whether to copy and/or collect data, and a decision as to the types of data to copy or collect. For example, based on decision-making by the MCP product, data can be collected from one or more specific systems of the vehicle. In another example, the MCP product analyzes sensor data from the vehicle. This analysis can be independent of any control or action by the host controller.

In another embodiment, the MCP product monitors data and/or signals of the vehicle. For example, the monitored signal can be a signal from a host controller. The data can be from sensors or from control systems of the vehicle.

In one embodiment, a memory device of a vehicle that can be used to collect and/or store data as described above includes: one or more sensors (e.g., accelerometer(s), gyroscope, LIDAR, etc.); non-volatile memory (e.g., cross-point memory such as 3DXP); at least one computing device (e.g., a CPU, FPGA, GPU, etc.); and memory (e.g., firmware) storing instructions configured to instruct the at least one computing device to: monitor data associated with operation of a vehicle; determine, based on the monitoring, first data to collect from the vehicle; collect the first data; and store the collected first data in the non-volatile memory. In various embodiments, the vehicle can be, for example, any of several types of autonomous vehicle (e.g., a car, truck, aircraft, drone, watercraft, etc.). The memory device can be incorporated as part of an MCP product.

In one embodiment, the memory device above collects the data itself instead of relying on or using the host controller to collect the data. For example, the memory device automatically accesses data being generated by sensors or other systems of the vehicle. Also, the memory device can automatically collect or receive certain types of data that is already being sent by the host controller to one or more other systems of the vehicle (e.g., sent during normal operation or in response to an event like air bag deployment). The memory device also can additionally collect data generated by its own sensors (e.g., sensors incorporated into a MCP product).

In some embodiments, the memory device itself automatically collects important data into a different area of the vehicle (e.g., a predetermined physical location or predetermined storage component). For example, certain data can be copied or transferred from volatile memory to a non-volatile memory or storage device as part of collecting and storing the data.

In some embodiments, after data is collected by the memory device, the data is analyzed. Based on this analysis, a new configuration can be determined for the vehicle. For example, a system (e.g., a navigation or engine control system) of the vehicle can be reconfigured or reset based on the analysis. In one example, when a car is at a dealer or other location and is having maintenance work done, a special tool or other appropriate fitting can be connected to the vehicle and used to analyze the automatically collected data.

In some cases, data is collected by logging of data from the vehicle by the memory device. The logging of data can be supplemented by use of wireless communication (e.g., a 5G or cellular network) to obtain logging data from the vehicle. For example, the logging data can be transmitted to a central server that monitors the operation of the vehicle.

The central server can collect and analyze the logged data. Based on this analysis, real-time operation of the vehicle can be configured.

At least some embodiments disclosed herein relate to a method for operating an autonomous vehicle. One or more systems of the vehicle are controlled by a host system. Data is automatically collected by a memory device. The collected data is generated by the one or more systems and/or by the memory device itself (e.g., sensors and/or a neural network of an MCP product). The data is collected by the memory device independently of real-time control by the host system. After being collected, the data is stored in the memory device.

In one example, the autonomous vehicle includes one or more sensors that collect sensor data. A non-volatile memory device of the vehicle is used to receive various data to be stored. One or more computing devices control the operation of the vehicle. At least one of these computing devices is used to control the automatic collection, by the non-volatile memory device, of data generated by the vehicle during operation. This data can include sensor data. The computing device is, for example, a controller of the memory device, and the controller executes instructions in firmware of the memory device. After collecting the data, the memory device stores the data (e.g., using non-volatile memory such as 3DXP memory).

FIG. 1 illustrates an autonomous vehicle 260 including a memory device 261 that collects data from the vehicle and stores the data in non-volatile memory 264, according to one embodiment. A host system 268 generally controls the operation of autonomous vehicle 260. For example, host system 268 sends various commands to the vehicle systems 270. Host system 268 also receives data from the vehicle systems 270. This data can include sensor data provided by one or more of the vehicle systems, status updates from processors of the vehicle systems, warning or error messages provided by the vehicle systems, etc.

Autonomous vehicle 260 can also include various other sensors 269 located at various positions within the vehicle. Sensors 269 provide data to host system 268 during operation of the vehicle 260.

Memory device 261 collects data during operation of the autonomous vehicle 260. For example, data can be collected from various vehicle systems 270. This data can be collected directly by the memory device 261 without any knowledge of and/or control of the data collection process by the host system.

Memory device 261 also can collect data from the various sensors 269 of the vehicle. This sensor data can be collected independently of any knowledge and/or control by host system 268.

Memory device 261 also can collect data and/or signals from host system 268. In some cases, this data and/or signals can be obtained from monitoring of one or more communication busses of the autonomous vehicle 260.

Memory device 261 can determine in real-time what data should be collected from the autonomous vehicle 260. This determination can be based on one or more of the data or other information received from vehicle systems 270, sensors 269, and/or host system 268. Memory device 261 also has one or more sensors 266 (e.g., integrated into the same multi-chip package component). Data from these sensors can be used independently of and/or in conjunction with the foregoing data to perform this determination. The result of the foregoing analysis determines the data that will be collected (e.g., in continuing data logging, and/or discrete or limited data collection processes) (e.g., one or more particular types of data can be collected for a predetermined time based on the analysis by the memory device). This result can be one or more types of data to collect and/or one or more systems or other components of the vehicle 260 from which to collect data.

Memory device 261 includes volatile memory 262 and non-volatile memory 264. In various embodiments, the data collected by memory device 261 is initially stored in volatile memory 262. Then, the data stored in volatile memory 262 is copied to non-volatile memory 264 for more-permanent storage.

In some embodiments, the data is copied to non-volatile memory 264 in response to an event. For example, memory device 261 can determine that the event of an accident has occurred, and/or is likely to occur (e.g., data from a sensor(s) can be determined to exceed a threshold). In another example, the data is stored in response to the analysis of the collected data above.

In one embodiment, memory device 261 collects data by periodic logging of data. For example, data can be logged every five seconds or less during operation of the vehicle.

In one embodiment, once an event such as an accident has occurred, data in volatile memory 262 is copied to and stored in non-volatile memory 264. The stored data is further coded to indicate the vehicle context and/or other conditions associated with the vehicle at the time of collecting and/or storing the data.

Figure 2:
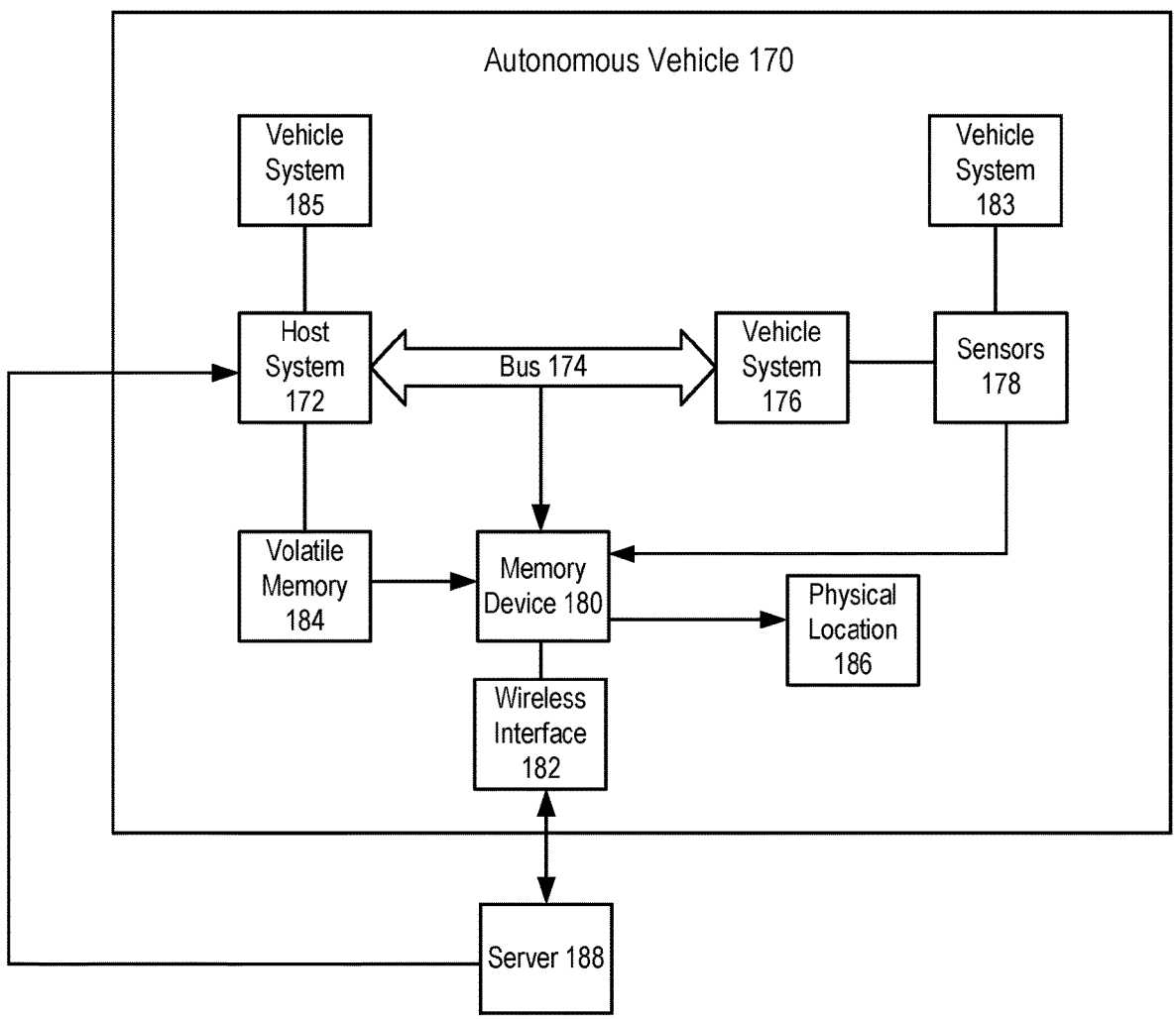
FIG. 2 illustrates an autonomous vehicle including a memory device that automatically collects data, according to one embodiment.

FIG. 2 illustrates an autonomous vehicle 170 including a memory device 180 that automatically collects data, according to one embodiment. Memory device 180 is an example of memory device 261 of FIG. 1.

Data is generated by various systems of the vehicle 170 including, for example, vehicle systems 176, 183, 185. For example, sensors 178 are used by vehicle system 176 and 183. Each system may perform processing on the sensor data and then transmit the data to another component of the vehicle and/or may pass through raw sensor data to another component.

In one example, data from vehicle system 176 is sent to a host system 172 over a communications bus 174. Host system 172 is an example of host system 268 of FIG. 1.

The host system 172 controls various operations of the vehicle system 176 (e.g., an image processing and recognition system). Host system 172 sends commands over bus 174 to vehicle system 176. For example, a command can be used to control engine operation or to implement steering control. Vehicle system 176 is an example of vehicle system 270 of FIG. 1.

Host system 172 also can control other systems such as vehicle systems 183 and/or vehicle system 185. Host system 172 can receive replies and/or data from these systems over one or more communication paths of the vehicle 170 (e.g., bus 174).

In one embodiment, memory device 180 monitors communications on bus 174. Memory device 180 can collect selected data from bus 174. In one example, memory device 180 listens for certain predetermined types of data for extraction from bus 174. The extracted data is stored by memory device 180.

In one embodiment, memory device 180 stores collected data in a predetermined physical location 186. Physical location 186 may correspond to a physical position or location of the vehicle 170. In other cases, physical location 186 may correspond to a particular predetermined component or a type of component (e.g., a particular type of memory storage media).

In one embodiment, memory device 180 collects data stored in a volatile memory 184. In one example, volatile memory 184 is used by host system 172. For example, host system 172 can collect data from various systems of vehicle 170. This data can be stored in volatile memory 184. In some cases, memory device 180 is configured to automatically extract data (e.g., certain predetermined types of data) from volatile memory 184 without any knowledge of, and/or control, by host system 172.

In one embodiment, memory device 180 collects data from the sensors 178. This collection is performed by memory device 180 independently of any control by host system 172.

In one embodiment, after data has been collected by memory device 180, the data is stored in memory device 180. The data can be stored initially in volatile memory of memory device 180 (e.g., volatile memory 262 of FIG. 1). The data can be copied from volatile memory for storage in non-volatile memory (e.g., non-volatile memory 264 of FIG. 1). In one embodiment, the stored data can be transmitted at a later time to a server 188 over a wireless interface 182.

In one embodiment, server 188 analyzes the collected data received from memory device 180. Based on this analysis, one or more configurations of vehicle 170 can be implemented or updated. For example, server 188 can send a command to memory device 180 via wireless interface 182 regarding a change in configuration to implement in vehicle 170. Memory device 180 can control the implementation of the configuration change.

In another embodiment, based on analysis of the collected data, server 188 sends a communication to host system 172. In one example, this communication can be sent via a wireless interface (not shown). The communication can be, for example, a command to update a configuration of vehicle 170. This update can be implemented under control of host system 172.

In one embodiment, the collected data is stored in a non-volatile memory device (e.g., memory device 180). After storing, the data is removed from the non-volatile memory device and, for example, analyzed by a server (e.g., a server in the cloud) (e.g., server 188).

In one embodiment, analysis of stored data is used to identify unsafe aspects or design of the software that operates the vehicle (e.g., software that executes on host system 172 to control navigation). In response to this analysis, control and/or configuration actions can be performed for the vehicle (e.g., via wireless interface 182). In some cases, the same or similar control and/or configuration can be performed for other vehicles (e.g., vehicles of the same type and/or using the same or similar software). The vehicle can be, for example, any of several types of autonomous vehicle (e.g., a car, truck, aircraft, drone, watercraft, etc.).

In various embodiments, the collected data can be stored by any of several non-volatile memory systems of the vehicle (e.g., at physical location 186). An example of a memory system is a storage system, such as a solid-state drive (SSD). In some embodiments, the memory system is a hybrid memory/storage system. In general, a vehicle can utilize a memory system that includes one or more memory devices. The memory devices can include media. The media can be non-volatile memory devices, such as, for example, negative-and (NAND).

In one embodiment, a cloud service (sometimes referred to as simply the cloud) is used to receive the collected data from the vehicle and then to analyze the data. For example, when the automatic emergency braking system of a vehicle is activated, event data (e.g., the location) of that braking event is transmitted to, for example, a server or other computing device in the cloud service.

In one embodiment, event data collected by memory device 180 is received from a vehicle and analyzed. For example, pattern recognition can be used on the received event data. In one case, machine learning is used to recognize patterns or regularities in data. In some cases, a pattern recognition system can be trained from labeled training data (e.g., supervised learning). In other cases, when no labeled data is available, other algorithms can be used to identify previously unknown patterns (e.g., unsupervised learning).

In one embodiment, an event occurring on the vehicle is detected based on a measurement of a brake pedal in a vehicle. For example, the event may be identified based on a foot pressure or extent of movement as compared to a predetermined threshold. In another embodiment, an event is identified based on a rate of deceleration of the vehicle. For example, if a rate of deceleration exceeds a predetermined threshold, then an event (e.g., a near collision) is identified. In another example, the rate of deceleration is observed over a predetermined time period (e.g., the rate is averaged over the time period). In response to detecting this event, system memory data is downloaded. The detection of such events can trigger collection of data by memory device 180.

In one embodiment, in response to analyzing event data, at least one action is performed. For example, a communication can be sent to vehicle 170 (e.g., from which the collected data is obtained) to configure software of the vehicle and/or disable one or more functions of the vehicle or software.

In one embodiment, in response to identifying unsafe software (e.g., as determined based on pattern recognition or other analysis of collected data), a server can perform one or more actions. For example, the server can send a communication to the current vehicle. In one case, the communication can cause the current vehicle to take corrective actions, such as terminating an autonomous navigation mode, braking, or changing course, or updating firmware of the vehicle (e.g., via an over-the-air firmware update).

In one embodiment, in response to receiving a communication from a server that has analyzed data collected by memory device 180, vehicle 170 can switch off its autonomous driving mode, use a backup system, and/or activate a braking system to stop the vehicle.

In another embodiment, the cloud service can send a communication to a server or other computing device that monitors an operating status for other vehicles (e.g., a central monitoring service). The communication can, for example, identify that a software component(s) is unsafe.

In one embodiment, the determination whether a vehicle has experienced a braking event and/or been involved in an accident can be based on data from one or more sensors of the vehicle. For example, data from an accelerometer of the vehicle can indicate a rapid deceleration of the vehicle (e.g., deceleration exceeding a threshold). In another case, data can indicate that an emergency system of the vehicle has been activated, such as for example, an airbag, an emergency braking system, etc. In some embodiments, any one and/or a combination of the foregoing events can be deemed to be an event for which downloaded data is transmitted to a server. Data associated with the foregoing events can be collected by memory device 180.

In one embodiment, one or more sensors (e.g., sensors 178) on the current vehicle are used to obtain data regarding braking events and/or objects in the environment of the vehicle as it travels. Data from the sensors and/or data generated based on analysis of sensor data and/or other data can be, for example, transmitted to the cloud service wirelessly (e.g., using a 3G, 4G, or 5G network or other radio-based communication system) after being collected automatically by memory device 180.

In one embodiment, in response to identifying unsafe software determined based on collected data, one or more actions of a vehicle are configured. For example, an over-the-air firmware update can be sent to the vehicle for updating firmware of a computing device of the vehicle (e.g., this update causes the vehicle to avoid identified unsafe functions). In one example, the firmware updates a navigation system of the vehicle.

Figure 3:
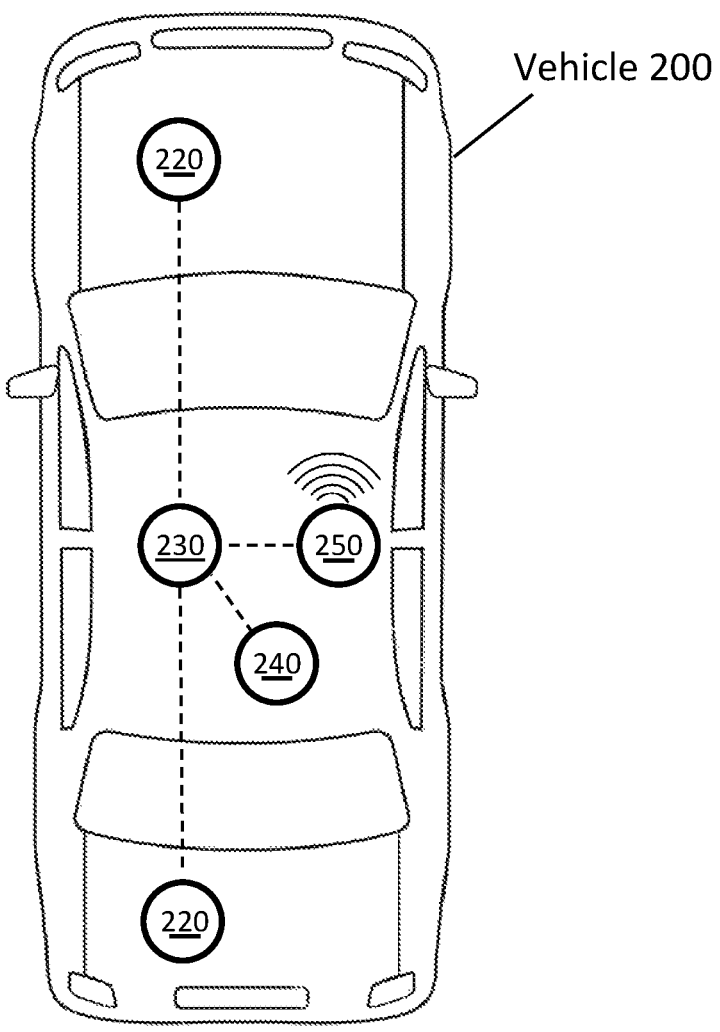
FIG. 3 illustrates a vehicle that collects data during operation, according to one embodiment.

FIG. 3 illustrates an autonomous vehicle 200 that collects data using sensors during navigation, according to one embodiment. For example, autonomous vehicle 200 detects various objects during travel. Vehicle 200 also detects certain events that trigger downloading data (e.g., from system memory) to a non-volatile memory device. In one example, vehicle 200 detects the event that a collision with an object (e.g., another vehicle) has occurred. In response to detecting the collision, a computing system of vehicle 200 causes system memory data to be downloaded to a non-volatile memory device. This is done to permit analysis of the downloaded data after the collision. In one example, any of the foregoing data can be collected automatically by memory device 180.

More particularly, in one embodiment, FIG. 3 illustrates a sensing system located on board vehicle 200 for collecting information concerning operation of the vehicle. Any of this collected data can be, for example, a portion of the data downloaded from system memory and/or from other volatile memory in response to detecting an event, or routinely collected during normal operation of the vehicle. For example, the sensing system can be used to collect object and event data for sending to a cloud service to be stored for analysis.

The sensing system, in various embodiments, may generally include one or more sensors 220, a processor 230, memory 240, and a communication device (e.g., transmitter 250). Other data in addition to object data can be collected for sending to the cloud service.

The sensing system, in various embodiments, may include one or more sensors 220 configured to collect information regarding operational aspects of autonomous vehicle 200, such as speed, vehicle speed, vehicle acceleration, braking force, braking deceleration, and the like. Representative sensors configured to collect information concerning operational driving characteristics may include, without limitation, tachometers like vehicle speed sensors or wheel speed sensor, brake pressure sensors, fuel flow sensors, steering angle sensors, and the like.

The sensing system, in various embodiments, may additionally or alternatively include one or more sensors 220 configured to collect information regarding the static environment in which autonomous vehicle 200 is operated, such as the presence and content of physical objects surrounding the vehicle. The physical objects include, for example, signage and traffic signals (e.g., stop signs, construction zones, speed limit signs, stop lights), road lane dividers (e.g., solid and dashed lane lines), and the like. Representative sensors configured to collect such static operating environment information may include outward-facing cameras positioned and oriented such that their respective fields of view can capture the respective information each is configured to collect. For example, a camera configured to capture surrounding signage may be configured towards the front of or on top of autonomous vehicle 200 and oriented forwardfacing (e.g., straight ahead or perhaps canted sideways by up to about 45 degrees) so as to capture roadside and overhead signage/traffic signals within its field of view as autonomous vehicle 200 travels forward.

As another example, cameras configured to capture road lane dividers may be positioned on the side of or off a front/rear quarter of autonomous vehicle 200 and may be oriented somewhat downwards so as to capture road lane dividers on both sides of vehicle autonomous 200. Additional representative sensors for collecting static operating environment information may include receivers configured to receive wireless signals from base stations or other transmitters communicating information that may ordinarily be found on signage or otherwise related to the static operating environment of autonomous vehicle 200. Likewise, global positioning system (GPS) or other location-related sensors may be utilized to collect information regarding the static environment in which vehicle 200 is operated, such as what street autonomous vehicle 200 is driving on, whether that street is a traffic artery (e.g., highway) or other type, and whether that location is in an urban or rural area.

The sensing system, in various embodiments, may additionally or alternatively include one or more sensors 220 configured to collect information regarding the dynamic environment in which autonomous vehicle 200 is operated, such as information concerning the presence of moving objects such as, for example, other nearby vehicles (e.g., along with such vehicle's location, direction of travel, rate of speed, and rate of acceleration/deceleration), as well as similar information concerning the presence of nearby pedestrians. Representative sensors configured to collect such dynamic operating environment information may include outward-facing cameras positioned and oriented such that their respective fields of view can capture the respective information each is configured to collect. For example, outward-facing cameras may be positioned about the perimeter of autonomous vehicle 200 (e.g., on the front, rear, top, sides, and/or quarters) to capture imagery to which image processing techniques such as vehicle recognition algorithms may be applied. Additionally or alternatively, one or more optical sensors (e.g., LIDAR, infrared), sonic sensors (e.g., sonar, ultrasonic), or similar detection sensors may be positioned about the vehicle for measuring dynamic operating environment information such as distance, relative velocity, relative acceleration, and similar characteristics of the motion of nearby piloted or autonomous vehicles.

The sensing system, in various embodiments, may leverage as sensor(s) 220 those sensors typically found in most autonomous vehicles such as, without limitation, those configured for measuring speed, RPMs, fuel consumption rate, and other characteristics of the vehicle's operation, as well as those configured for detecting the presence of other vehicles or obstacles proximate the vehicle. Sensors 220 may additionally or alternatively comprise aftermarket sensors installed on autonomous vehicle 200 for facilitating the collection of additional information related to driving style.

The sensing system of vehicle 200, in various embodiments, may further comprise an onboard processor 230, onboard memory 240, and an onboard transmitter 250. Generally speaking, in various embodiments, processor 230 may be configured to execute instructions stored on memory 240 for processing information collected by sensor(s) 200 for subsequent transmission offboard vehicle 200. Onboard processor 230, in various embodiments, may additionally or alternatively be configured to execute instructions stored on memory 240 for processing information from two or more sensors 220 to produce further information concerning object characteristics detected by autonomous vehicle 200. For example, in an embodiment, processor 230 may process operational characteristics, such as braking deceleration, alongside dynamic environment characteristics, such as following distance, to avoid debris or an animal suddenly appearing in the roadway. It should be recognized that this is merely an illustrative example, and that one of ordinary skill in the art will recognize further ways sensor data may be processed by a processor to produce further information concerning objects detected by autonomous vehicle 200.

Processor 230, in various embodiments, may be configured to pre-process information from sensor(s) 220 for subsequent offboard transmission via transmitter 250. Pre-processing activities may include one or a combination of filtering, organizing, and packaging the information from sensors 220 into formats and communications protocols for efficient wireless transmission. In such embodiments, the pre-processed information may then be transmitted offboard vehicle 200 by transmitter 250 in real-time or at periodic intervals, where it may be received by nearby piloted or autonomous vehicles and/or a remote server. It should be appreciated that transmitter 250 may utilize short-range wireless signals (e.g., Wi-Fi, BlueTooth) when configured to transmit the pre-processed information directly to nearby piloted or autonomous vehicles, and that transmitter 250 may utilize longer-range signals (e.g., cellular, satellite) when transmitting the pre-processed information directly to the remote server, according to various embodiments later described.

In one embodiment, processor 230 can be a processor of a memory device (e.g., memory device 180) that operates independently of a host system to automatically collect data from vehicle 200.

Like sensor(s) 220, in various embodiments, processor 230 and/or onboard transmitter 250 may be integrally installed in vehicle 200 (e.g., car computer, connected vehicles), while in other embodiments, processor 230 and/or transmitter 250 may be added as an aftermarket feature.

Figure 4:
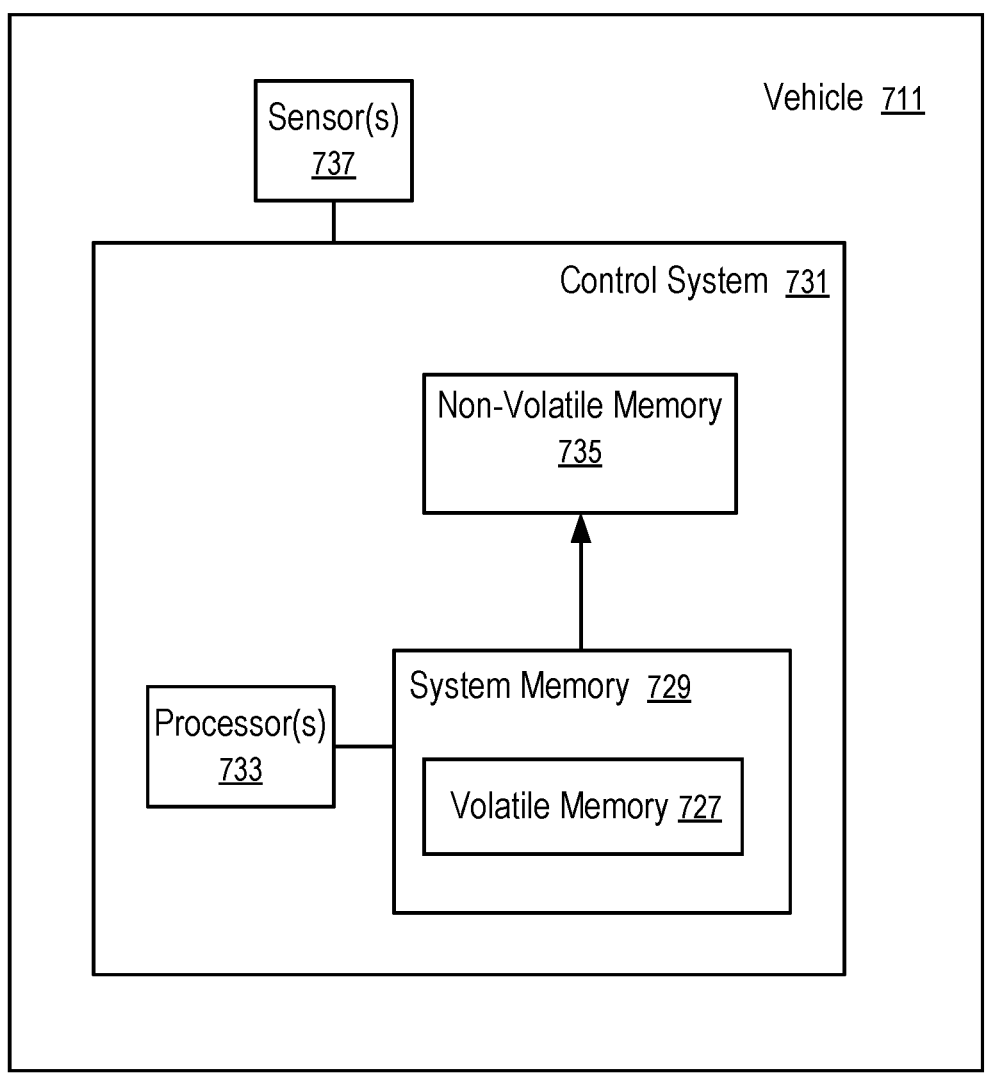
FIG. 4 illustrates a vehicle that stores data in a non-volatile memory, according to one embodiment.

FIG. 4 illustrates a vehicle 711 that stores data in a non-volatile memory 735, according to one embodiment. Non-volatile memory 735 is an example of non-volatile memory 264 of FIG. 1.

In one embodiment, a control system 731 is used to download data in response to detecting an event associated with a vehicle 711. In one example, the control system 731 is included in memory device 180 of FIG. 2, and the downloaded data is collected by memory device 180.

Vehicle 711 includes sensors 737. Control system 731 also controls at least one operation (e.g. navigation and/or braking) of the vehicle. The control system 731 includes one or more processors 733, non-volatile memory 735, and system memory 729, which includes volatile memory 727. System memory 729 may also include, for example, data of vehicle 711 stored in other volatile memory devices (not shown).

The volatile memory 727 may be, for example, a dynamic random access memory device. Volatile memory 727 is an example of volatile memory 262 of FIG. 1.

Volatile memory 727 is used to store data used by software during operation of the vehicle such as sensor data and data regarding the operational state of the control system 731. The sensor data is collected, for example, by sensors 737 and/or by sensors (e.g., sensors 266 of FIG. 1) of the control system 731 itself (not shown).

Non-volatile memory 735 is used to store data from the volatile memory 727 after an event is detected. Examples of non-volatile memory 735 include cross-point memory (e.g., 3DXP memory) and NAND flash memory, as well as removable memory devices such as solid state disks.

The vehicle 711 uses sensors 737 and control system 731 to detect various events, as mentioned above. These events can include, for example, the collision of vehicle 711 with an object. Other events may be detection of a system activity such as emergency braking system activation or sensor data exceeding a threshold. When an event is detected, data stored in volatile memory 727 is downloaded to non-volatile memory 735. Examples of the stored data includes sensor data such as data regarding acceleration, vehicle speed and braking status, LIDAR and video input, location data and control system status such as a program counter indicating operational state of the software executing during the event. In some embodiments, after an event is detected by control system 731, downloading of volatile data to non-volatile data is performed within a specific time duration (e.g. less than five to ten seconds).

In one embodiment, the control system 731 of vehicle 711 may be configured to extract event data from the non-volatile memory and analyze that data. The event data is extracted after being downloaded following detection of an event. For example, the event data can be transmitted wirelessly to a central server that monitors the travel and operation of vehicle 711.

In one embodiment, only a predetermined portion of system memory 729 is downloaded. Processor 733 can determine after detection of an event the predetermined portion to be downloaded. In another embodiment, data from system memory 729 can be downloaded portion by portion in an order based on priority of data. The priority may be determined by a type of event detected by control system 731.

Figure 5:
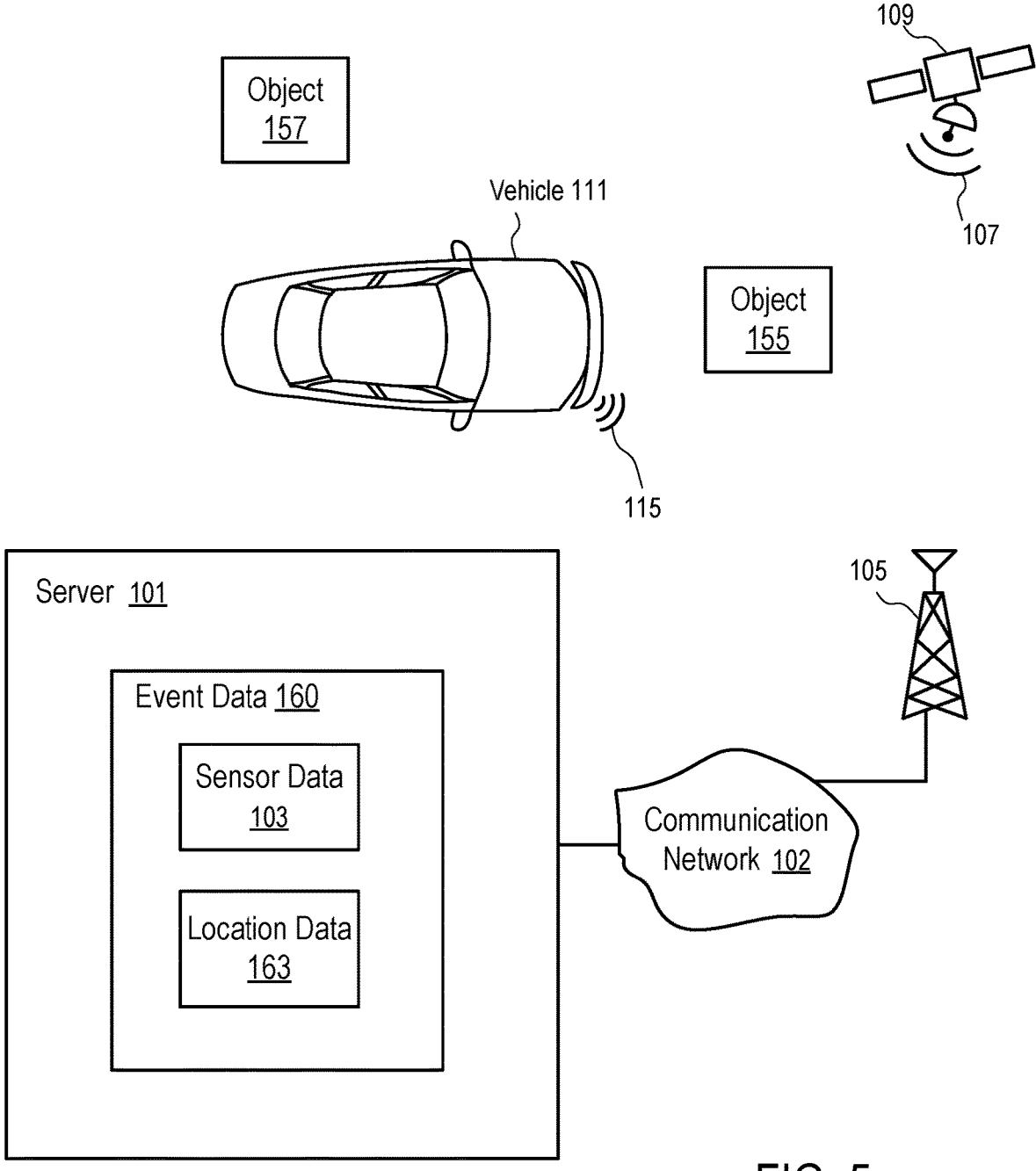
FIG. 5 illustrates a server that stores event data received from a vehicle, according to one embodiment.

FIG. 5 illustrates a server 101 that stores event data received from a vehicle 111, according to one embodiment. Vehicle 111 is an example of autonomous vehicle 260 of FIG. 1.

In one example, if a collision of vehicle 111 and object 155 is detected, event data 160 (e.g., stored in volatile memory 727 of FIG. 4) is downloaded from system memory 729 to non-volatile memory 735. Event data 160 can include data such as sensor data 103 (obtained from sensors of vehicle 111), location data 163, data related to activation of an emergency braking system, or data output from an artificial neural network. During operation, vehicle 711 collects data regarding objects that are detected such as object 155 and object 157.

The event data 160 is extracted from the non-volatile memory and communicated through a wireless communication network 102 to a server 101. Server 101 analyzes the event data 160 to determine a cause of the collision (e.g., software failure). For example, server 101 can use emulation to determine whether software executing on the vehicle 111 functioned properly. Server 101 can select the type of event data 160 (e.g. sensor data or control system status) to be downloaded for analysis. One example of wireless communication network 102 is a cell phone network.

The collected event data received from the vehicle 111 by server 101 is analyzed. For example, this analysis can include pattern recognition or other data analysis (e.g., determining a correlation of event data to other data).

In response to identifying a failure of software, at least one action is performed. For example, server 101 can transmit a communication to vehicle 111 that causes the vehicle to re-configure software.

In one example, a vehicle may communicate, via a wireless connection 115 to an access point (or base station) 105, with the server 101 to submit event data. The wireless connection 115 may be made via a wireless local area network, a cellular communications network, and/or a communication link 107 to a satellite 109 or a communication balloon.

Optionally, the vehicle 111 has a self-learning capability. After an extended period on the road, the vehicle 111 may have its software re-configured. In one example, the centralized server 101 may be operated by a factory, a producer or maker of the vehicle 111 or a vendor of the autonomous driving and/or advanced driver assistance system for vehicle 111.

Figure 6:
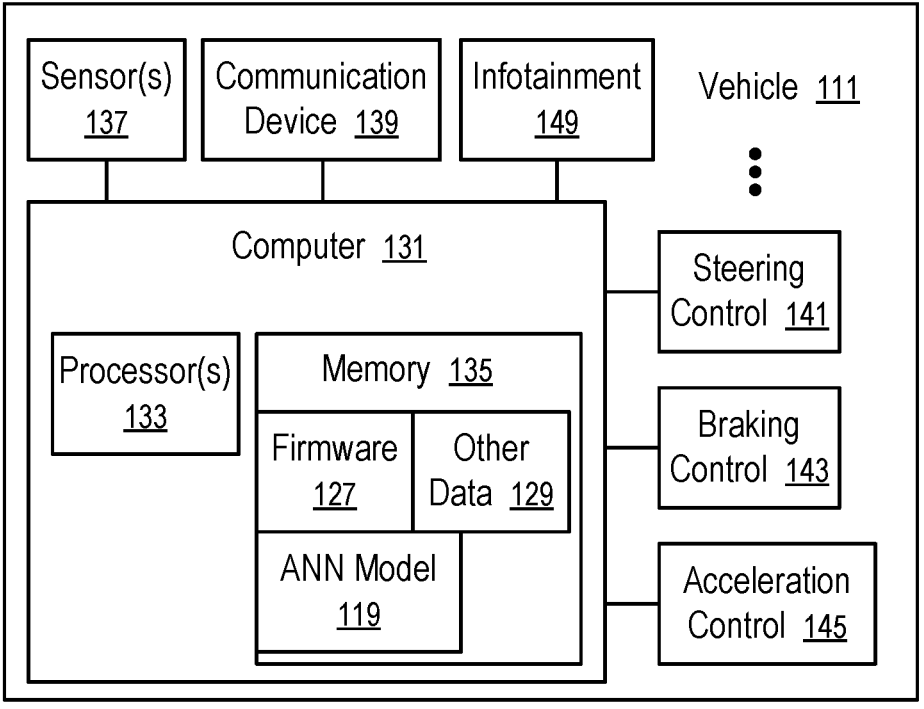
FIG. 6 illustrates an example of a vehicle configured using an Artificial Neural Network (ANN) model, according to one embodiment.

FIG. 6 illustrates an example of vehicle 111 as configured using an Artificial Neural Network (ANN) model, according to one embodiment. The vehicle 111 includes an infotainment system 149, a communication device 139, one or more sensors 137, and a computer 131 that is connected to some controls of the vehicle 111, such as a steering control 141 for the direction of the vehicle 111, a braking control 143 for stopping of the vehicle 111, an acceleration control 145 for the speed of the vehicle 111, etc.

The computer 131 of the vehicle 111 includes one or more processors 133, memory 135 storing firmware (or software) 127, the ANN model 119, and other data 129.

In one example, firmware 127 is updated by an over-the-air update in response to a communication from server 101 sent in response to identifying faulty software. Alternatively, and/or additionally, other firmware of various computing devices or systems of vehicle 111 can be updated.

The one or more sensors 137 may include a visible light camera, an infrared camera, a LIDAR, RADAR, or sonar system, and/or peripheral sensors, which are configured to provide sensor input to the computer 131. A module of the firmware (or software) 127 executed in the processor(s) 133 applies the sensor input to an ANN defined by the model 119 to generate an output that identifies or classifies an event or object captured in the sensor input, such as an image or video clip. Data from this identification and/or classification can be included in data collected by a memory device (e.g., memory device 180) and sent from a vehicle to server 101 as discussed above.

Alternatively, and/or additionally, the identification of unsafe software can be used by an autonomous driving module of the firmware (or software) 127 to generate a response. The response may be a command to activate and/or adjust one of the vehicle controls 141, 143, and 145. In one embodiment, the response is an action performed by the vehicle where the action has been configured based on an update command from server 101 (e.g., the update command can be generated by server 101 in response to determining that software of vehicle 111 is faulty based on analysis of event data). In one embodiment, prior to generating the control response, the vehicle is configured. In one embodiment, the configuration of the vehicle is performed by updating firmware of vehicle 111. In one embodiment, the configuration of the vehicle includes updating of the computer model stored in vehicle 111 (e.g., ANN model 119).

In one embodiment, the server 101 stores received sensor input as part of sensor data for the subsequent further training or updating of the ANN model 119 using the supervised training module 117. When an updated version of the ANN model 119 is available in the server 101, the vehicle 111 may use the communication device 139 to download the updated ANN model 119 for installation in the memory 135 and/or for the replacement of the previously installed ANN model 119. These actions may be performed in response to determining that vehicle 111 is failing to properly detect objects and/or in response to identifying unsafe software.

In one example, the outputs of the ANN model 119 can be used to control (e.g., 141, 143, 145) the acceleration of a vehicle (e.g., 111), the speed of the vehicle 111, and/or the direction of the vehicle 111, during autonomous driving.

In one example, data obtained from a sensor of a vehicle may be an image that captures an object using a camera that images using lights visible to human eyes, or a camera that images using infrared lights, or a sonar, radar, or LIDAR system. In one embodiment, image data obtained from at least one sensor of the vehicle is part of the collected data from the vehicle that is analyzed. In some instances, the ANN model is configured for a particular vehicle based on the sensor and other collected data.

Figure 7:
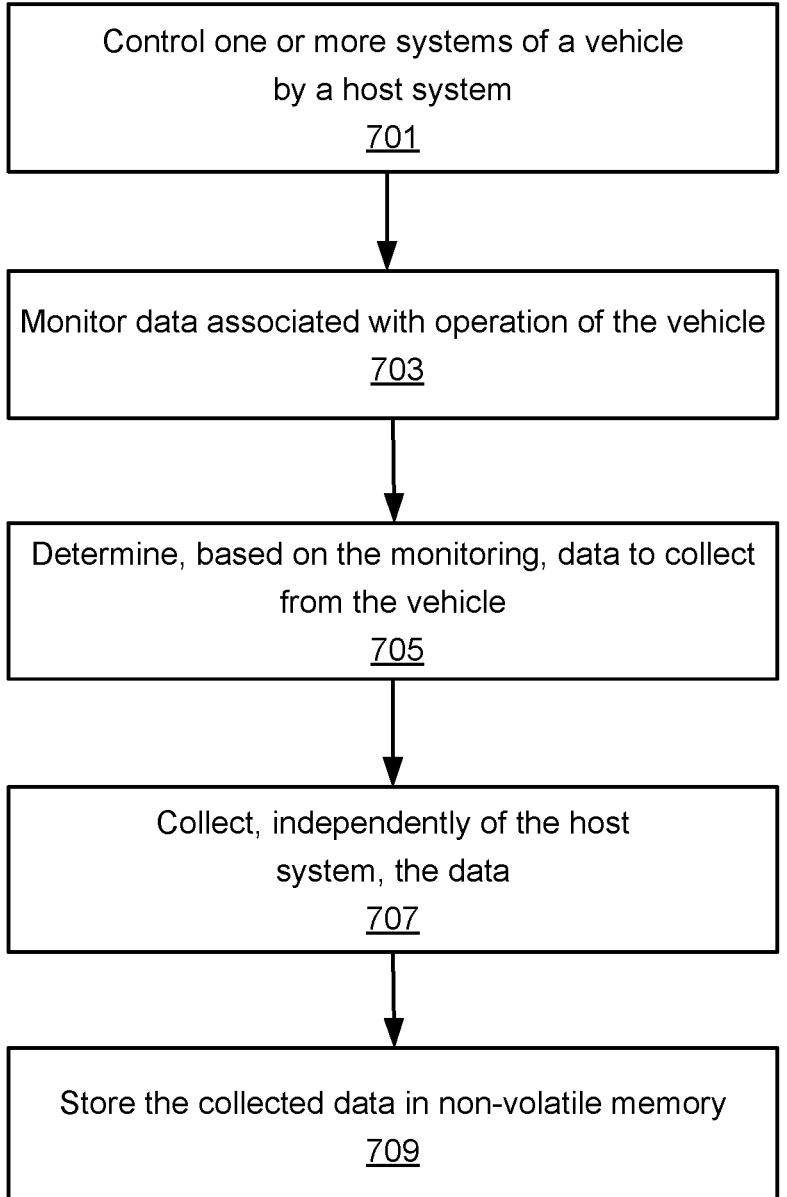
FIG. 7 shows a method to automatically collect and store data from an autonomous vehicle, according to one embodiment.

FIG. 7 shows a method to automatically collect and store data from an autonomous vehicle (e.g., vehicle 260, 170, 200, 711, or 111), according to one embodiment. In block 701, one or more systems of a vehicle are controlled by a host system. For example, the host system can be host system 268 and control vehicle systems 270.

In block 703, data associated with operation of the vehicle is monitored. For example, memory device 261 or memory device 180 can monitor data associated with operation of vehicle 260 or vehicle 170. The data monitored can be, for example, data from host system 268, sensors 269, and/or vehicle systems 270. The monitored data can also include, for example, data from sensors 266.

In block 705, based on monitoring of the data, data to collect from the vehicle is determined. For example, memory device 261 can determine data to collect from the vehicle based on analysis of the various data previously received from the vehicle. In one example, the determination of the data to collect is based on one or more outputs from one or more neural networks or other machine learning systems. In one embodiment, previously-received data is used to train a machine learning model, which is implemented as a neural engine in a processor of the memory device 261. In one example, the determined data to collect is initiation of collection of data (e.g., of a certain type and/or from a certain system). In another example, the determined data to collect is a change in a data collection configuration for an existing or ongoing data logging or other collection process. For example, a new type of data is added to the data logging process based on the monitoring.

In block 707, data is collected from the vehicle. The data is collected independently of the host system (e.g., data collection is re-configured without first seeking confirmation or approval from, and/or without first notifying, the host system). For example, memory device 261 can determine that certain types of data should be collected from one of the particular vehicle systems 270. In another example, memory device 261 can determine that certain communications and/or signals of the vehicle should be collected. For example, if an airbag is being deployed, then the data collected is obtained primarily from vehicle systems related to airbag control, activation and/or deployment.

In block 709, the collected data is stored in non-volatile memory. For example, memory device 261 can collect data from vehicle 260 and initially store the data in volatile memory 262. The data is then copied from volatile memory 262 to non-volatile memory 264.

In another example, volatile memory 262 already contains certain data that has been previously received by memory device 261 (e.g., from prior logging of data). Based on monitoring the data associated with operation of the vehicle, memory device 261 can copy the data from volatile memory 262 to non-volatile memory 264 in response to an event detected by memory device 261 (e.g., an event detected for vehicle 270, such as an accident).

In one embodiment, a method for an autonomous vehicle includes: controlling at least one system of the vehicle by a host system; monitoring, by a memory device, data associated with operation of the vehicle; determining, by the memory device based on the monitoring, first data to collect from the vehicle; collecting, by the memory device independently of the host system, the first data; and storing, by the memory device, the collected first data in a non-volatile memory.

In one embodiment, the first data is collected from volatile memory, and a multichip package includes the volatile memory and the non-volatile memory.

In one embodiment, the multichip package further includes at least one sensor.

In one embodiment, monitoring the data associated with operation of the vehicle includes monitoring data obtained from the at least one sensor.

In one embodiment, the at least one system includes at least one sensor, and the first data is collected from the at least one sensor.

In one embodiment, the method further includes: determining, by the memory device independently of the host system, that an event has occurred, wherein determining that the event has occurred is based on monitoring the data associated with operation of the vehicle; and in response to determining that the event has occurred, collecting, by the memory device, second data from the vehicle.

In one embodiment, the second data is collected from volatile memory.

In one embodiment, the memory device includes at least one sensor, and monitoring the data associated with operation of the vehicle includes monitoring data collected by the at least one sensor.

In one embodiment, monitoring the data associated with operation of the vehicle further includes receiving at least one signal from the host system.

In one embodiment, the method further includes: generating at least one code based on the at least one signal received from the host system; and associating the at least one code with the collected first data; wherein storing the collected first data includes storing the at least one code in association with the collected first data.

In one embodiment, determining the first data to collect includes identifying a first system of the vehicle, and collecting the first data includes collecting data from the first system.

In one embodiment, monitoring the data associated with operation of the vehicle includes determining that an event has occurred, and collecting the first data is performed in response to determining that the event has occurred.

In one embodiment, a memory device includes: at least one sensor configured to collect sensor data from a vehicle; non-volatile memory configured to store data from at least one of the at least one sensor or a host system of the vehicle, wherein the host system controls at least one system of the vehicle; at least one computing device; and memory storing instructions configured to instruct the at least one computing device to: monitor data associated with operation of the vehicle; determine, based on the monitoring, first data to collect from the vehicle; collect the first data; and store the collected first data in the non-volatile memory.

In one embodiment, collecting the first data includes obtaining the first data from at least one communications bus of the vehicle.

In one embodiment, data used by software is stored in system memory of the host system, and the first data includes at least a portion of the data used by the software.

In one embodiment, the first data is collected from volatile memory, and a multichip package includes the volatile memory and the non-volatile memory.

In one embodiment, the multichip package further includes the at least one sensor.

In one embodiment, a memory device includes: at least one sensor; non-volatile memory; at least one computing device; and memory storing instructions configured to instruct the at least one computing device to: monitor data associated with operation of a vehicle; determine, based on the monitoring, first data to collect from the vehicle; collect the first data; and store the collected first data in the non-volatile memory.

In one embodiment, storing the collected first data includes storing the collected first data at a predetermined location in the vehicle.

In one embodiment, the instructions are further configured to instruct the at least one computing device to determine a format based on monitoring the data associated with operation of the vehicle, and storing the collected first data includes formatting the collected first data into the format.

Figure 8:
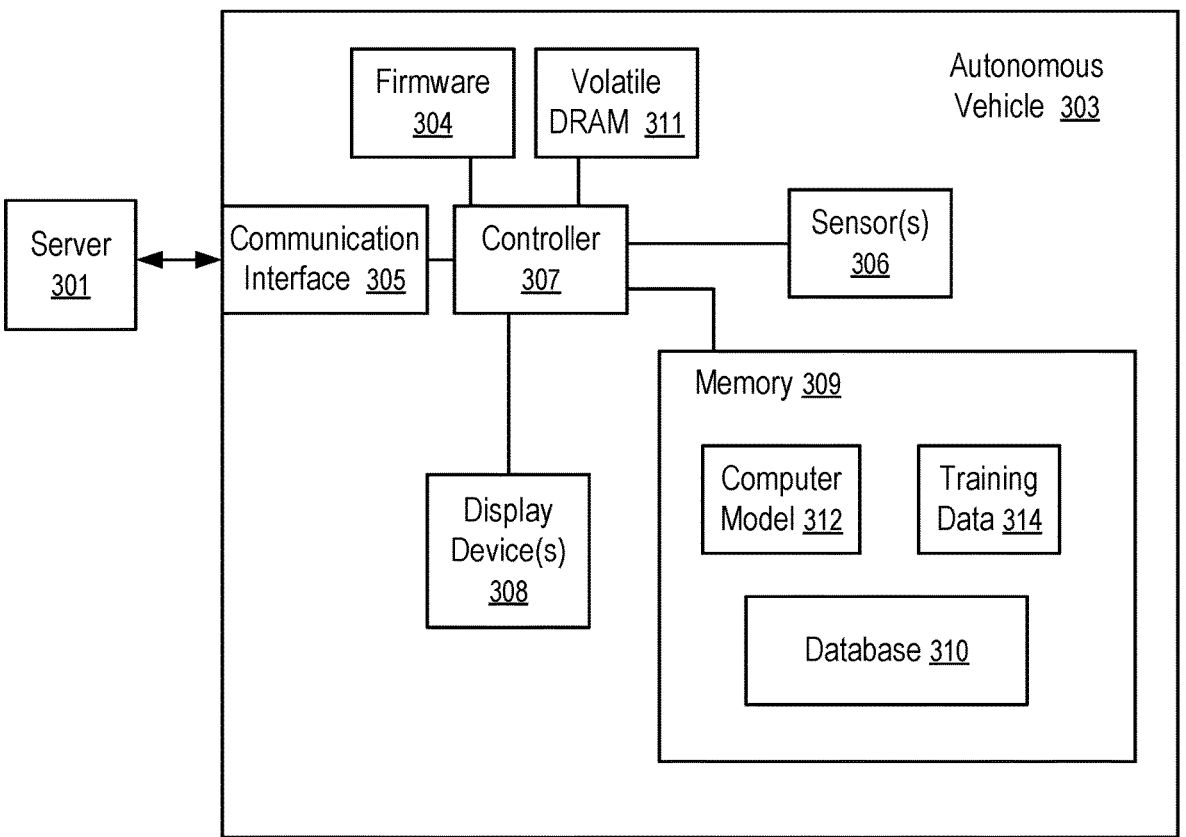
FIG. 8 shows an autonomous vehicle controlled and/or configured in response to an analysis of stored data collected from a vehicle, according to one embodiment.

FIG. 8 shows an autonomous vehicle 303 controlled and/or configured in response to an analysis of collected data, according to one embodiment. For example, the data collected is collected by memory device 261 based on monitoring data associated with operation of the vehicle.

Systems of vehicle 303 include a display device 308 or other device, system, or component. In one example, a controller 307 is included in a memory device 180, and controller 307 controls collection of data from various systems of the vehicle 303.

Server 301 may store, for example, event data 160 collected by controller 307 and sent to server 301. Server 301 may determine, using event data 160, that software of vehicle 303 is operating improperly. In response to this determination, server 301 may cause the controller 307 to terminate an autonomous navigation mode. Other actions can be performed in response to this determination including, for example, configuring a vehicle 303 by updating firmware 304, updating computer model 312, updating data in database 310, and/or updating training data 314.

The controller 307 may receive data collected by one or more sensors 306. The sensors 306 may be, for example, mounted in the autonomous vehicle 303. The sensors 306 may include, for example, a camera, a microphone, and/or a motion detector. At least a portion of the sensors may provide data associated with objects newly detected by vehicle 303 during travel.

The sensors 306 may provide various types of data for collection by the controller 307. For example, the collected data may include image data from the camera and/or audio data from the microphone.

In one embodiment, the controller 307 analyzes the collected data from the sensors 306. The analysis of the collected data includes providing some or all of the collected data as one or more inputs to a computer model 312. The computer model 312 can be, for example, an artificial neural network trained by deep learning. In one example, the computer model is a machine learning model that is trained using training data 314. The computer model 312 and/or the training data 314 can be stored, for example, in memory 309.

An output from the computer model 312 can be transmitted to server 301 as part of object data.

In one embodiment, memory 309 stores a database 310, which may include data collected by sensors 306 and/or data received by a communication interface 305 from computing device, such as, for example, a server 301. In one example, this communication may be used to wirelessly transmit collected data from the sensors 306 to the server 301. The received data may include configuration, training, and other data used to configure control of the display devices 308 or other components by controller 307. The received data may also be used to update a configuration of a machine learning model stored in memory 309 as computer model 312.

In one embodiment, firmware 304 controls, for example, the operations of the controller 307 in controlling components of vehicle 303. The controller 307 also can, for example, run the firmware 304 to perform operations responsive to communications from the server 301. The autonomous vehicle 303 includes volatile Dynamic Random-Access Memory (DRAM) 311 for the storage of run-time data and instructions used by the controller 307. The run-time data and/or instructions can be part of the data downloaded in response to detecting an event.

At least some embodiments of the systems and methods disclosed herein can be implemented using computer instructions (e.g., firmware) executed by a controller or processor. In some instances, hardware circuits can be used to implement at least some of the functions of the firmware. The firmware can be initially stored in non-volatile storage media or another non-volatile device, and loaded into volatile DRAM and/or the in-processor cache memory for execution. In one example, the firmware can be configured to control collection of data from a vehicle.

Figure 9:
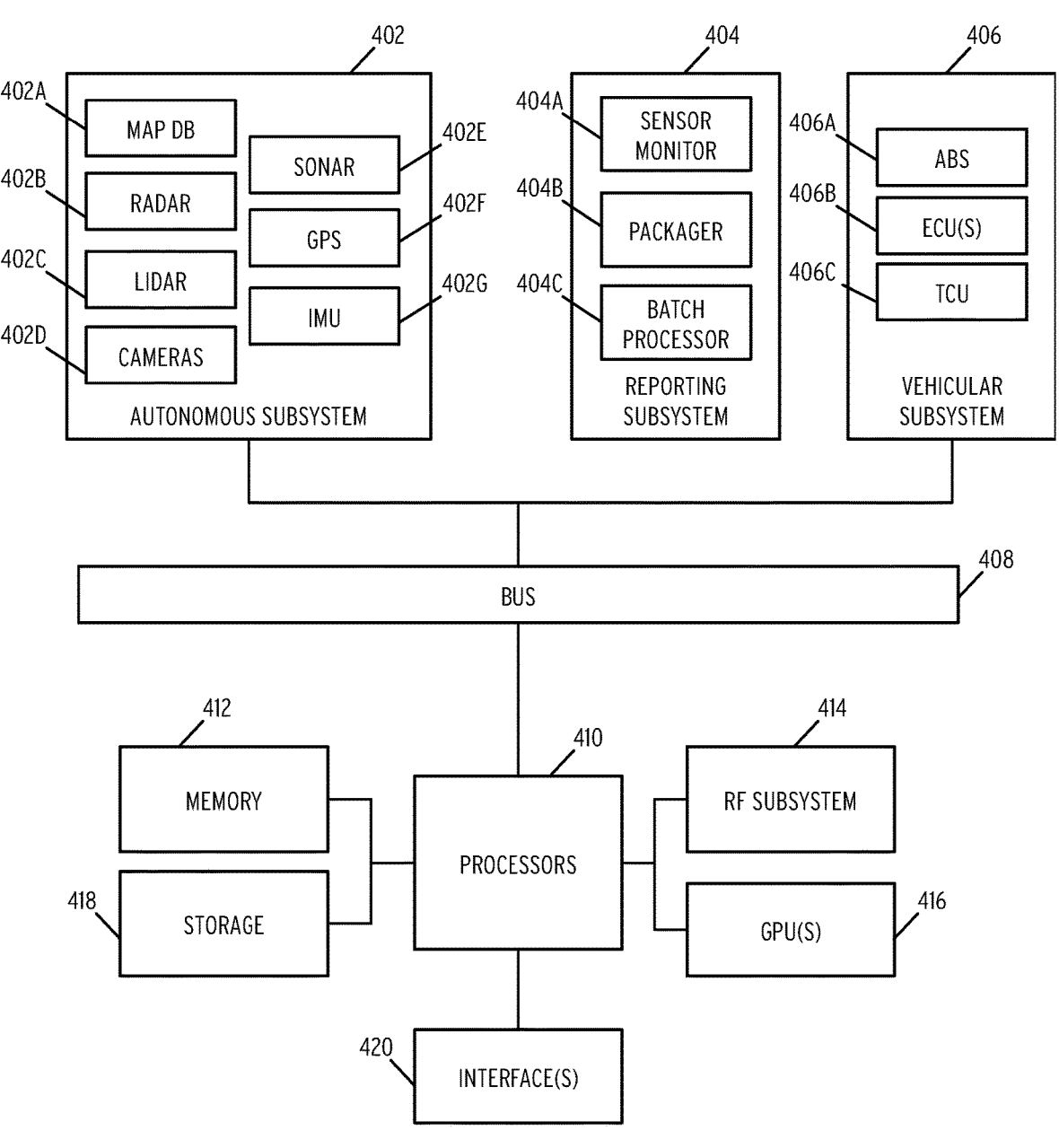
FIG. 9 is a block diagram of an autonomous vehicle including one or more various components and/or subsystems, each of which can be updated in various embodiments to configure the vehicle and/or perform other actions associated with the vehicle.

FIG. 9 is a block diagram of an autonomous vehicle (e.g., vehicle 170 or 260) including one or more various components and/or subsystems, each of which can be updated in various embodiments to configure the vehicle and/or perform other actions associated with the vehicle (e.g., configuration and/or other actions performed in response to identifying a fault in software or other data based on data collected by memory device 180 or 261). The system illustrated in FIG. 9 may be installed entirely within a vehicle.

The system includes an autonomous vehicle subsystem 402. Subsystem 402 is an example of vehicle system 176 of FIG. 2. In the illustrated embodiment, autonomous vehicle subsystem 402 includes map database 402A, radar devices 4026, Lidar devices 402C, digital cameras 402D, sonar devices 402E, GPS receivers 402F, and inertial measurement units 402G. Each of the components of autonomous vehicle subsystem 402 comprise standard components provided in most current autonomous vehicles. In one embodiment, map database 402A stores a plurality of high-definition three-dimensional maps used for routing and navigation. Radar devices 402B, Lidar devices 402C, digital cameras 402D, sonar devices 402E, GPS receivers 402F, and inertial measurement units 402G may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem 406 is additionally included within the system. Vehicular subsystem 406 includes various anti-lock braking systems 406A, engine control units 402B, and transmission control units 402C. These components may be utilized to control the operation of the autonomous vehicle in response to the streaming data generated by autonomous vehicle subsystem 402A. The standard autonomous vehicle interactions between autonomous vehicle subsystem 402 and vehicular subsystem 406 are generally known in the art and are not described in detail herein.

The processing side of the system includes one or more processors 410, short-term memory 412, an RF system 414, graphics processing units (GPUs) 416, long-term storage 418 and one or more interfaces 420.

The one or more processors 410 may comprise central processing units, FPGAs, or any range of processing devices needed to support the operations of the autonomous vehicle. Memory 412 comprises DRAM or other suitable volatile RAM for temporary storage of data required by processors 410. RF system 414 may comprise a cellular transceiver and/or satellite transceiver. Long-term storage 418 may comprise one or more high-capacity solid-state drives (SSDs). In general, long-term storage 418 may be utilized to store, for example, high-definition maps, routing data, and any other data requiring permanent or semi-permanent storage. GPUs 416 may comprise one or more high throughput GPU devices for processing data received from autonomous vehicle subsystem 402A. Finally, interfaces 420 may comprise various display units positioned within the autonomous vehicle (e.g., an in-dash screen).

The system additionally includes a reporting subsystem 404 which performs data collection (e.g., collection of data obtained from sensors of the vehicle that is used to drive the vehicle). The reporting subsystem 404 includes a sensor monitor 404A which is connected to bus 408 and records sensor data transmitted on the bus 408 as well as any log data transmitted on the bus. The reporting subsystem 404 may additionally include one or more endpoints to allow for system components to transmit log data directly to the reporting subsystem 404.

The reporting subsystem 404 additionally includes a packager 404B. In one embodiment, packager 404B retrieves the data from the sensor monitor 404A or endpoints and packages the raw data for transmission to a central system (illustrated in FIG. 10). In some embodiments, packager 404B may be configured to package data at periodic time intervals. Alternatively, or in conjunction with the foregoing, packager 404B may transmit data in real-time and may compress data to facilitate real-time communications with a central system.

The reporting subsystem 404 additionally includes a batch processor 404C. In one embodiment, the batch processor 404C is configured to perform any preprocessing on recorded data prior to transmittal. For example, batch processor 404C may perform compression operations on the data prior to packaging by packager 404B. In another embodiment, batch processor 404C may be configured to filter the recorded data to remove extraneous data prior to packaging or transmittal. In another embodiment, batch processor 404C may be configured to perform data cleaning on the recorded data to conform the raw data to a format suitable for further processing by the central system.

Each of the devices is connected via a bus 408. Bus 408 is an example of bus 174 of FIG. 2. In one embodiment, the bus 408 may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 10:
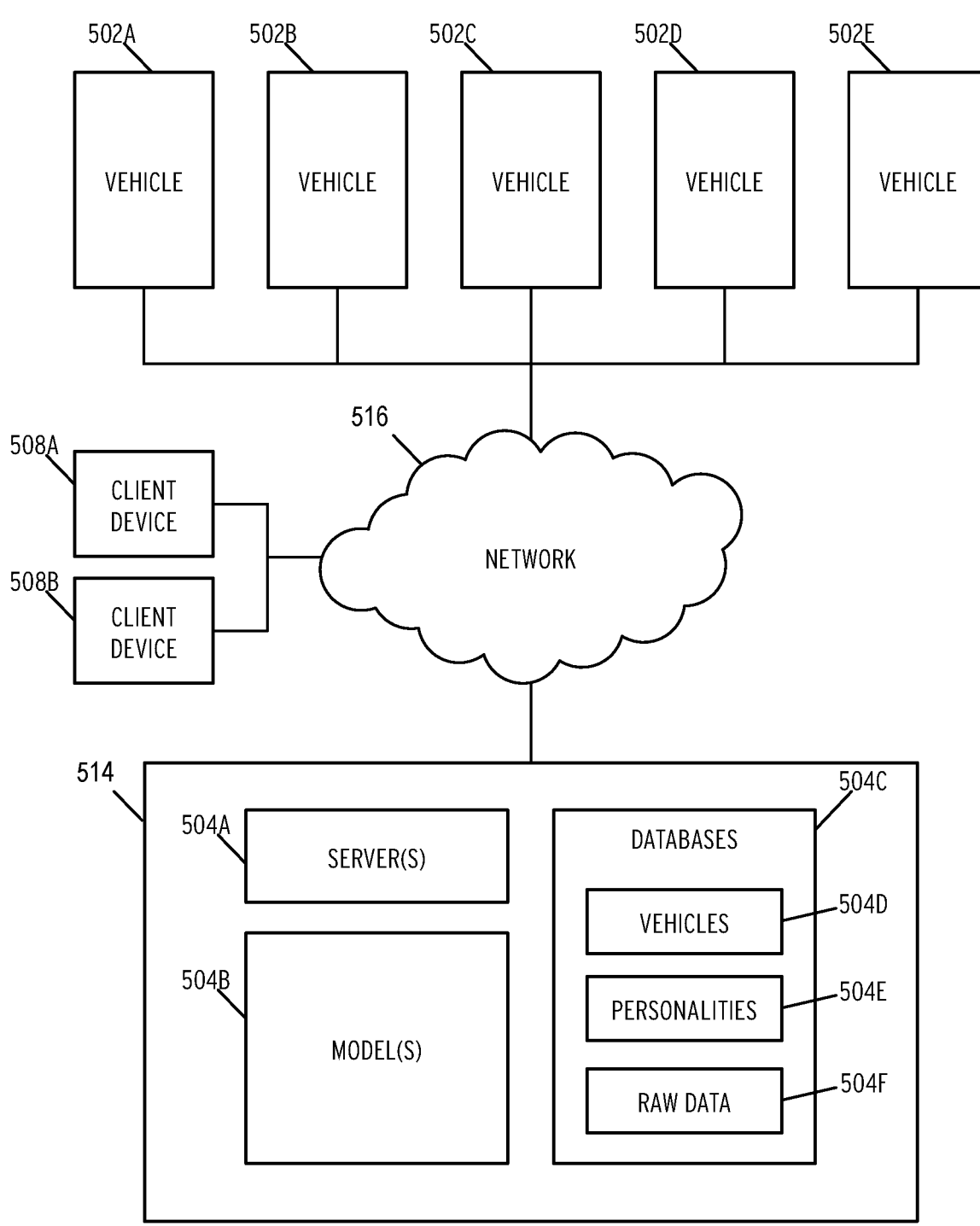
FIG. 10 is a block diagram of a centralized autonomous vehicle operations system, according to various embodiments.

FIG. 10 is a block diagram of a centralized autonomous vehicle operations system, according to various embodiments. As illustrated, the system includes a number of autonomous vehicles 502A-502E. In one embodiment, each autonomous vehicle may comprise an autonomous vehicle such as that depicted in FIG. 9. Each autonomous vehicle 502A-502E may communicate with a central system 514 via a network 516. In one embodiment, network 516 comprises a global network such as the Internet.

In one example, central system 514 is implemented using one or more of servers 101 or 301. In one example, one or more of autonomous vehicles 502A-502E are autonomous vehicle 170, 200, or 711.

The system additionally includes a plurality of client devices 508A, 508B. In the illustrated embodiment, client devices 508A, 508B may comprise any personal computing device (e.g., a laptop, tablet, mobile phone, etc.). Client devices 508A, 508B may issue requests for data from central system 514. In one embodiment, client devices 508A, 508B transmit requests for data to support mobile applications or web page data, as described previously.

In one embodiment, central system 514 includes a plurality of servers 504A. In one embodiment, servers 504A comprise a plurality of front end webservers configured to serve responses to client device 508A, 508B. The servers 504A may additionally include one or more application servers configured to perform various operations to support one or more vehicles.

In one embodiment, central system 514 additionally includes a plurality of models 504B. In one embodiment, models 504B may store one or more neural networks for classifying autonomous vehicle objects. The models 504B may additionally include models for predicting future events. In some embodiments the models 504B may store a combination of neural networks and other machine learning models.

Central system 514 additionally includes one or more databases 504C. The databases 504C may include database record for vehicles 504D, personalities 504E, and raw data 504F. Raw data 504F may comprise an unstructured database for storing raw data received from sensors and logs as discussed previously.

The present disclosure includes methods and apparatuses which perform the methods described above, including data processing systems which perform these methods, and computer readable media containing instructions which when executed on data processing systems cause the systems to perform these methods.

A server and/or a computing device of a vehicle above can be implemented as one or more data processing systems. A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus comprising:

at least one sensor;

at least one memory device;

volatile memory;

non-volatile memory; and at least one processor configured to:

receive, at the memory device and from the sensor, first data that is associated with operation of systems of a vehicle, wherein the operation of the systems is controlled by a host processor of the vehicle;

receive, at the memory device, second data from the systems of the vehicle, the host processor of the vehicle, or any combination thereof:

store, by the memory device based on receipt of the first data and the second data, the first data and the second data in the volatile memory;

identify, by the memory device based on the first data from the sensor and the second data from the systems, the host processor, or any combination thereof, a first system of the systems that is indicating an operational deviation; and transfer, automatically by the memory device in response to identifying the first system, a copy of third data having a type from the volatile memory to the non-volatile memory to permanently store the copy of the third data, wherein the type of the third data is determined in real-time based on the first data and the second data.

2. The apparatus of claim 1, wherein the copy of the third data is stored at a predetermined location in the vehicle.

3. The apparatus of claim 1, wherein the second data comprises second signals from the host processor of the vehicle.

4. The apparatus of claim 1, wherein the second data comprises signals from the host processor of the vehicle, and the processor is further configured to:

generate at least one code based on at least one signal received from the host processor of the vehicle, wherein the code is associated with the operational deviation; and associate the at least one code with the copy of the third data.

5. The apparatus of claim 4, wherein the at least one code is stored in association with the copy of the third data.

6. The apparatus of claim 1, wherein the processor is further configured to:

receive, via the second data, respective data from the first system.

7. An apparatus comprising:

at least one memory device;

volatile memory;

non-volatile memory; and at least one processor configured to:

receive, at the memory device and from at least one sensor of a vehicle, first data associated with operation of the vehicle, wherein a host processor of the vehicle is configured to control the operation of the vehicle using a plurality of systems;

store, by the memory device in response to receipt of the first data, the first data in the volatile memory;

identify, by the memory device autonomously based on the stored first data, an operational deviation of a first system of the plurality of systems of the vehicle controlled by the host processor; and transfer, in response to identifying the operational deviation, a copy of second data having a determined type from the volatile memory to the non-volatile memory to permanently store the second data, the determined type of the second data based on signals from the host processor.

8. The apparatus of claim 7, wherein the volatile memory and the non-volatile memory are included in a multichip package.

9. The apparatus of claim 8, wherein the multichip package further includes the at least one second sensor.

10. The apparatus of claim 8, wherein the multichip package further includes an accelerometer, and a signal from the accelerometer triggers collection of the first data.

11. The apparatus of claim 7, wherein receiving the first data associated with the operation of the vehicle includes monitoring for the first the data obtained from the at least one sensor of the vehicle.

12. The apparatus of claim 11, wherein monitoring for the first data associated with operation of the vehicle further includes monitoring for data obtained from at least one second sensor located in the memory device of the vehicle, and wherein the at least one sensor is separate from the memory device.

13. A method comprising:

storing, by a memory device of a vehicle, sensor data associated with systems of the vehicle in a volatile memory of the memory device, the sensor data received from a first sensor of the vehicle, wherein the systems of the vehicle are controlled by a host system of the vehicle;

receiving, by the memory device and from the host system, first signals;

identifying, by the memory device based on the sensor data and the first signals, a first system of the systems that is providing an error or warning message; and transferring, in response to identifying the first system, a copy of first data having a determined type from the volatile memory to non-volatile memory to permanently store the first data, wherein the type of the first data is based on the sensor data and the first signals.

14. The method of claim 13, wherein the first data comprises data from at least one communications bus of the vehicle.

15. The method of claim 13, wherein data used by software executing on the vehicle is stored in system memory of the host system of the vehicle, and the first data comprises at least a portion of the data used by the software.

16. The method of claim 13, wherein the first data includes data collected from at least one sensor of the vehicle, the at least one sensor comprising the first sensor, a second sensor, or both.

17. The method of claim 13, further comprising:

receiving, at the memory device and from the first system, second data;

wherein the type of the first data to collect is further determined based on the second data, based on third data collected from a second sensor of the vehicle, or both.

* * * * *